United States Patent [19]

Atkinson et al.

[11] Patent Number: 5,160,711

[45] Date of Patent: Nov. 3, 1992

[54] CYANIDE LEACHING METHOD FOR RECOVERING PLATINUM GROUP METALS FROM A CATALYTIC CONVERTER CATALYST

[75] Inventors: Gary B. Atkinson, Reno; Robert J. Kuczynski, Sparks; Dennis P. Desmond, Reno, all of Nev.

[73] Assignee: The United States of America as represented by the Secretary of the Interior, Washington, D.C.

[21] Appl. No.: 698,031

[22] Filed: May 10, 1991

[51] Int. Cl.$^5$ .................... C01G 55/00; C22B 11/00
[52] U.S. Cl. .................... 423/22; 423/213.5; 75/744; 75/732; 75/735
[58] Field of Search ............ 423/22, 27, 34, 213.5; 75/744, 732, 735

[56] References Cited

U.S. PATENT DOCUMENTS

| 963,111 | 7/1910 | Avery et al. | 423/22 |
| 3,469,971 | 9/1969 | Leopard | 423/22 |
| 4,578,163 | 3/1986 | Kunter et al. | 204/110 |
| 4,637,865 | 1/1987 | Sergent et al. | 204/111 |

FOREIGN PATENT DOCUMENTS 173452 11/1916 Canada .................. 75/744

OTHER PUBLICATIONS

Mellor, *A Comprehensive Treatise on Inorganic and Theoretical Chemistry*, Longmans, Green and Co. Ltd. (1941), p. 500.

Kirk-Othmer, *Encyclopedia of Chemical Technology*, Third Edition, vol. 7, John Wiley & Sons (1979).

Kirk-Othmer, *Encyclopedia of Chemical Technology*, Third Edition, vol. 5, John Wiley & Sons (1979), pp. 48-50.

Dawson, "Testwork on Samples of Oxidized Ore from the Potgietersrus Prospect," Mintek, South Africa, No. M59D, 1982 26 pp.

Hoffmann, "Recovering Platinum Group Metals From Auto Catalysts," *Journal of Metals*, Jun. 1988, pp. 40-44.

Mishra, "Recovery of Platinum Group Metals From Automobile Catalytic Converters-A Review," *Precious Metals '89*, The Minerals, Metals and Materials Society, 1988, pp. 483-501.

*Primary Examiner*—Theodore Morris
*Assistant Examiner*—Edward Squillante
*Attorney, Agent, or Firm*—E. Philip Koltos

[57] ABSTRACT

A method for recovering platinum group metals from a catalyst material comprises leaching the material with a cyanide solution at a temperature greater than about 100° C. to form soluble platinum group metal-cyanide complexes in solution. Solids are removed from the resulting pregnant leach solution, and the pregnant leach solution is then heated to a temperature sufficient to decompose the platinum group metal-cyanide complexes and precipitate the platinum group metals.

15 Claims, No Drawings

CYANIDE LEACHING METHOD FOR RECOVERING PLATINUM GROUP METALS FROM A CATALYTIC CONVERTER CATALYST

FIELD OF THE INVENTION

The present invention relates to cyanide leaching methods for recovering platinum group metals from various materials, and particularly from catalyst materials used in automobile catalytic converters having ceramic or metal supports.

BACKGROUND OF THE INVENTION

Platinum group metals are often employed as catalysts in automobile catalytic converters. Because platinum group metals are relatively expensive and are often obtained from sources outside the United States, it is advantageous to recover platinum group metals from such catalyst materials. Because most catalyst materials containing platinum group metals are of a low grade, direct dissolution and refining of the platinum group metals is not feasible and the catalyst materials must first be processed to obtain a platinum group metal-containing concentrate.

Both hydrometallurgical and pyrometallurgical methods are currently employed to recover platinum group metals from catalyst materials and the like. For example, strong sulfuric acid leaching has been used to dissolve the gamma alumina substrate of pellet-type catalysts and yield a platinum group metal concentrate. Monolith catalysts have been leached with sulfuric acid to dissolve the gamma alumina wash coat from the cordierite substrate. After washing, the platinum group metals are dissolved with aqua regia, and the resulting solution is treated to recover a platinum group metal concentrate. Dry chlorination has also been shown to be effective for transporting metal chlorides from the support. Pyrometallurgical methods for processing have included plasma fusion with an iron collector metal, melting the catalyst with copper as a collector metal, and charging the materials directly to a smelter to recover the platinum group metals in the normal operating processes.

Excluding the method of platinum group metal recovery by direct charging to smelters, the estimated recoveries for platinum group metals in these prior art processes range from 80 to 94 percent for platinum, 80 to 96 percent for palladium and 65 to 90 percent for rhodium. However, reagent consumption and severe corrosion cause the hydrometallurgical processes to be disadvantageous. On the other hand, high energy consumption and contamination of the platinum group metals with impurities such as nickel cause the pyrometallurgical processes to be disadvantageous. Thus, new methods for recovering platinum group metals from catalyst materials and the like which overcome the disadvantages of prior art methods are needed.

Cyanide has been used to dissolve platinum group metals from ores at temperatures up to 120° C. with only limited success owing to low extractions and high cyanide consumption, Dawson, "*Testwork on Samples of Oxidized Ore from the Potgietersrus Prospect,*" Mintek, South Africa, No. M59D, 1982, 26pp. Dawson disclosed that only 30 percent of the platinum and 75 percent of the palladium were dissolved. Additionally, thermal treatment of solutions containing free and complexed cyanides of Fe, Ni, Ag, Cd, Zn and Cu has been disclosed as effective for cyanide disposal, Tan et al, *Plt. Srf. Fn.,* Vol. 74, No. 4, April 1987, pp. 70-73.

SUMMARY OF THE INVENTION

Accordingly, it is an object of the present invention to provide new methods for recovering platinum group metals from catalyst materials and the like. It is a further object of the present invention to provide methods for recovering platinum group metals from catalyst materials and the like, which methods avoid the high reagent consumption, high energy consumption and severe corrosion problems encountered in the methods of the prior art. It is a further object to provide methods for recovering platinum group metals, which methods provide high grade concentrates of the desired metals.

These and additional objects are provided by the methods of the present invention for recovering platinum group metals from catalyst materials and the like. The methods according to the present invention combine a cyanide leaching step with a thermal decomposition step. More particularly, the methods according to the present invention comprise leaching the catalyst material or the like which contains the platinum group metal with a cyanide solution at a temperature greater than about 100° C. to form soluble platinum group metal-cyanide complexes in solution. Solids are removed from the resulting pregnant leach solution, and the pregnant solution is then heated to a temperature sufficient to decompose the platinum group metal-cyanide complexes and precipitate the platinum group metals. Thus, the present invention provides an easy and efficient means for recovering platinum group metals from catalyst materials and the like.

These and additional objects and advantages will be more fully understood in view of the following detailed description.

DETAILED DESCRIPTION

The methods of the present invention relate to the recovery of platinum group metals from a catalyst material or the like. Platinum group metals include platinum (Pt), rhodium (Rh), palladium (Pd), ruthenium (Ru), osmium (Os) and iridium (Ir). The methods of the present invention are particularly suitable for use in recovering platinum, rhodium and palladium from catalyst materials such as are found in the catalytic converters of automobiles.

In accordance with the present methods, the catalyst material or the like containing at least one of the platinum group metals is leached with a cyanide solution at a temperature greater than about 100° C. The platinum group metals and the cyanide form soluble complexes in solution. While free cyanide is decomposed to ammonia and carbonates at elevated temperatures, the reaction rate of cyanide with the platinum group metals to form the soluble complexes is significantly faster than the decomposition rate of cyanide. As noted above, the leaching step is conducted at a temperature greater than about 100° C. More preferably, the leaching step is conducted at a temperature greater than about 120° C. If palladium is present in the catalyst materials, the leaching temperature should not exceed 180° C., and more preferably 160° C. If only platinum and rhodium are contained in the catalyst material, and not palladium, the leaching temperature may be as high as 220° C., but more preferably does not exceed 180° C. Increasing the leaching temperature will improve dissolution of the platinum group metals until the temperature is reached where the platinum group metal-cyanide complexes begin to decompose. However, the platinum group metal-cyanide complexes which are formed are relatively stable up to the decomposition temperatures. Additionally, substantially all free cyanide in the solution is decomposed.

Accessibility of the cyanide solution to the platinum group metals determines the completeness of leaching. While almost complete dissolution, i.e., greater than 98%, of platinum group metals has been achieved during leaching of virgin catalysts where little sintering or masking of the platinum group metals with impurities has occurred, leaching platinum group metals from used catalysts may be less complete and depends on the history of the catalyst. It may be helpful to provide one or more pretreatments before cyanide leaching in order to improve the dissolution of the platinum group metals. For example, a preleach step with an alkali metal hydroxide, for example, aqueous sodium hydroxide, may improve the access of the cyanide solution to the platinum group metals by dissolving some sintered alumina and other impurities in the catalyst material. While agitation is not required during the leaching step, it may be beneficial. Additionally, the leaching step may be conducted in a pressure vessel at a pressure greater than atmospheric. Moreover, because of the highly dispersed nature of platinum group metals in catalyst materials and the like, excessive crushing of the materials is generally not required prior to the leaching step.

It is preferred that a basic cyanide solution is employed in the leach step. Alkali metal cyanides such as sodium cyanide have been found to be particularly effective. The amount of cyanide compound included in the cyanide solution employed in the leaching step will be determined based on the concentration of platinum group metals contained in the catalyst or other material from which the platinum group metals are being recovered. Preferably, the cyanide solution comprises from about 0.1 to about 10 weight percent of a cyanide compound. For example, complete dissolution of the platinum group metals in 100 grams of solids containing 50 oz of the platinum group metals per ton of solids may be achieved in an autoclave leach using an aqueous solution prepared from 200 ml of water and 10 g of NaCN. Alternatively, leaching the solids twice with two g of NaCN in each step will produce the same or better recoveries while decreasing cyanide consumption.

The solution to solids ratio is not critical for good recoveries. As will be apparent, decreasing the volume of the cyanide solution will result in a pregnant leach solution containing higher concentrations of platinum group metals and will allow the use of smaller vessels to leach the catalyst material. Additionally, higher concentrations of platinum group metals in the pregnant leach solution will make recovery easier.

After the leaching step, the solids are removed from the resulting pregnant leach solution, and the pregnant solution is then heated to a temperature sufficient to decompose the platinum group metal-cyanide complexes and precipitate the platinum group metal. Pregnant solutions containing palladium are heated to a temperature greater than about 160° C., and more preferably greater than about 200° C., to effect decomposition of the palladium-cyanide complexes. Pregnant solutions containing platinum and rhodium should be heated to a temperature greater than about 200° C., and more preferably greater than about 250° C., in order to effect decomposition of the metal-cyanide complexes.

The thermal decomposition of the platinum group metal-cyanide complexes causes the platinum group metals to precipitate in the solution, decomposes the cyanide to ammonia and carbonates and destroys most other base metal-cyanide complexes. The resulting solutions generally contain less than about 0.2 ppm cyanide while producing high grade platinum group metal products. If desired, the heat treatment which results in the thermal decomposition of the metal-cyanide complexes may be conducted under a pressure greater than atmospheric pressure.

Generally, the methods of the present invention result in the recovery of platinum and palladium from catalyst materials and the like in percentages comparable to other methods known in the art. However, the methods according to the present invention generally result in higher rhodium recovery as compared with prior art methods. Additionally, the present methods are advantageous owing to low capital costs and the low corrosive nature of the basic cyanide solutions employed herein.

The methods of the present invention are demonstrated by the following examples in which parts, ratios and percentages are by weight unless otherwise specified.

EXAMPLE 1

In this example, a sample of used monolith catalytic converter material was crushed to minus 8 mesh and leached with a 5% NaCN solution in an autoclave at 160° C. for one hour. A solution to solids ratio of 5:1 was employed. After filtering and washing, measurements indicated that 67% of the palladium, 87% of the platinum and 79% of the rhodium were leached from the material which originally contained 8.4 oz/ton palladium, 24 oz/ton platinum and 1.5 oz/ton rhodium.

EXAMPLE 2

In this example, a further sample of the used monolith catalytic converter material employed in example 1 was leached with a 1% NaCN solution in an autoclave at 160° C. for one hour. A solution to solids ratio of 2:1 was employed. After filtering and washing, measurements indicated that 75% of the palladium, 84% of the platinum and 71% of the rhodium were leached from the catalyst material.

EXAMPLE 3

In this example, a sample of used pellet-type catalyst containing 6 oz/ton of palladium, 14 oz/ton of platinum and 0.8 oz/ton of rhodium was employed. The catalyst was leached with a 1% NaCN solution in an autoclave at 160° C. for one hour. A solution to solids ratio of 2:1 was employed. After filtering and washing, measurements indicated that 97% of the palladium, 94% of the platinum and 98% of the rhodium were leached from the material.

EXAMPLE 4

In this example, a further sample of the used monolith catalytic converter material employed in example 1 was preleached with a 1.25 N sodium hydroxide solution for one hour at 80° C. The resulting residue was dried and then leached with a 5% NaCN solution in an autoclave at 160° C. for one hour. After filtering and washing, measurements indicated that 85% of the palladium, 91% of the platinum and 84% of the rhodium were leached from the material.

EXAMPLE 5

A platinum group metal (PGM) concentrate containing platinum, palladium and rhodium was recovered from pregnant leaching solutions by thermal decomposition of the cyanide complexes in accordance with the present methods. The table below shows the effect of the thermal decomposition temperature on decomposition of the cyanide complexes. Analysis also showed that the free and total cyanide in solution was decreased to less than 0.25 ppm at both 250° and 275° C.

TABLE

Effect of temperature on rejection of PGM from cyanide leaching solutions

| Temp, °C. | Reactor pressure, psig | solution analysis, ppm | | |
|---|---|---|---|---|
| | | Pt | Pd | Rh |
| Head. | — | 145 | 42 | 14 |
| 200 | 210 | 146 | 1.4 | 12 |
| 225 | 350 | 102 | 0.4 | 5.4 |
| 250 | 560 | 0.2 | <0.1 | <0.1 |
| 275 | 850 | 0.4 | <0.1 | <0.1 |

The preceding examples are set forth to illustrate specific embodiments of the invention and not intended to limit the scope of the methods of the present invention. Additional embodiments and advantages within the scope of the claimed invention will be apparent to one of ordinary skill in the art.

What is claimed is:

1. A method for recovering platinum group metal from a catalyst, comprising
   (a) leaching a catalytic converter catalyst containing at least one platinum group metal selected from the group consisting of platinum, rhodium and palladium with a cyanide solution at a temperature greater than about 100° C. to form soluble platinum group metal-cyanide complexes in solution;
   (b) removing solids from the resulting pregnant leach solution; and
   (c) heating the pregnant leach solution from which the solids have been removed to a temperature sufficient to decompose the platinum group metal-cyanide complexes and precipitate the platinum group metal.

2. A method as defined by claim 1, wherein the catalyst comprises platinum and rhodium.

3. A method as defined by claim 2, wherein the leaching temperature is in the range of from about 120° C. to about 220° C.

4. A method as defined by claim 2, wherein the pregnant leach solution is heated at a temperature greater than about 250° C. to decompose the platinum group metal-cyanide complexes and precipitate the platinum group metals.

5. A method as defined by claim 1, wherein the catalyst comprises platinum, rhodium and palladium.

6. A method as defined by claim 5, wherein the leaching temperature is in the range of from about 120° C. to about 180° C.

7. A method as defined by claim 5, wherein the pregnant leach solution is heated at a temperature greater than about 200° C. to decompose the platinum group metal cyanide complexes and precipitate the platinum group metals.

8. A method as defined by claim 1, wherein the leaching temperature is greater than about 120° C.

9. A method as defined by claim 1, wherein the cyanide solution comprises an alkali metal cyanide.

10. A method as defined by claim 7, wherein the cyanide solution comprise sodium cyanide.

11. A method as defined by claim 1, wherein the cyanide solution comprises from 0.1 to about 10 weight percent of a cyanide compound.

12. A method as defined by claim 1, wherein the pregnant leaching solution is conducted at a pressure greater than atmospheric pressure.

13. A method as defined by claim 1, wherein the pregnant leach solution from which solids have been removed is heated under a pressure greater than atmospheric pressure.

14. A method as defined by claim 1, wherein the catalyst is preleached with an alkali metal hydroxide solution prior to the cyanide leaching step in order to remove non-platinum group metal impurities from the catalyst.

15. A method for recovering platinum group metal from a catalyst, comprising
   (a) leaching a catalytic converter catalyst containing at least one platinum group metal selected from the group consisting of platinum, rhodium and palladium with a cyanide solution at a temperature in the range of from about 120° C. to 160° C. to form soluble platinum group metal-cyanide complexes in solution;
   (b) removing solids from the resulting pregnant leach solution; and
   (c) heating the pregnant leach solution from which the solids have been removed at a temperature greater than about 200° C. and sufficient to decompose the platinum group metal-cyanide complexes and precipitate the platinum group metal.

* * * * *